United States Patent Office 3,534,985
Patented Oct. 20, 1970

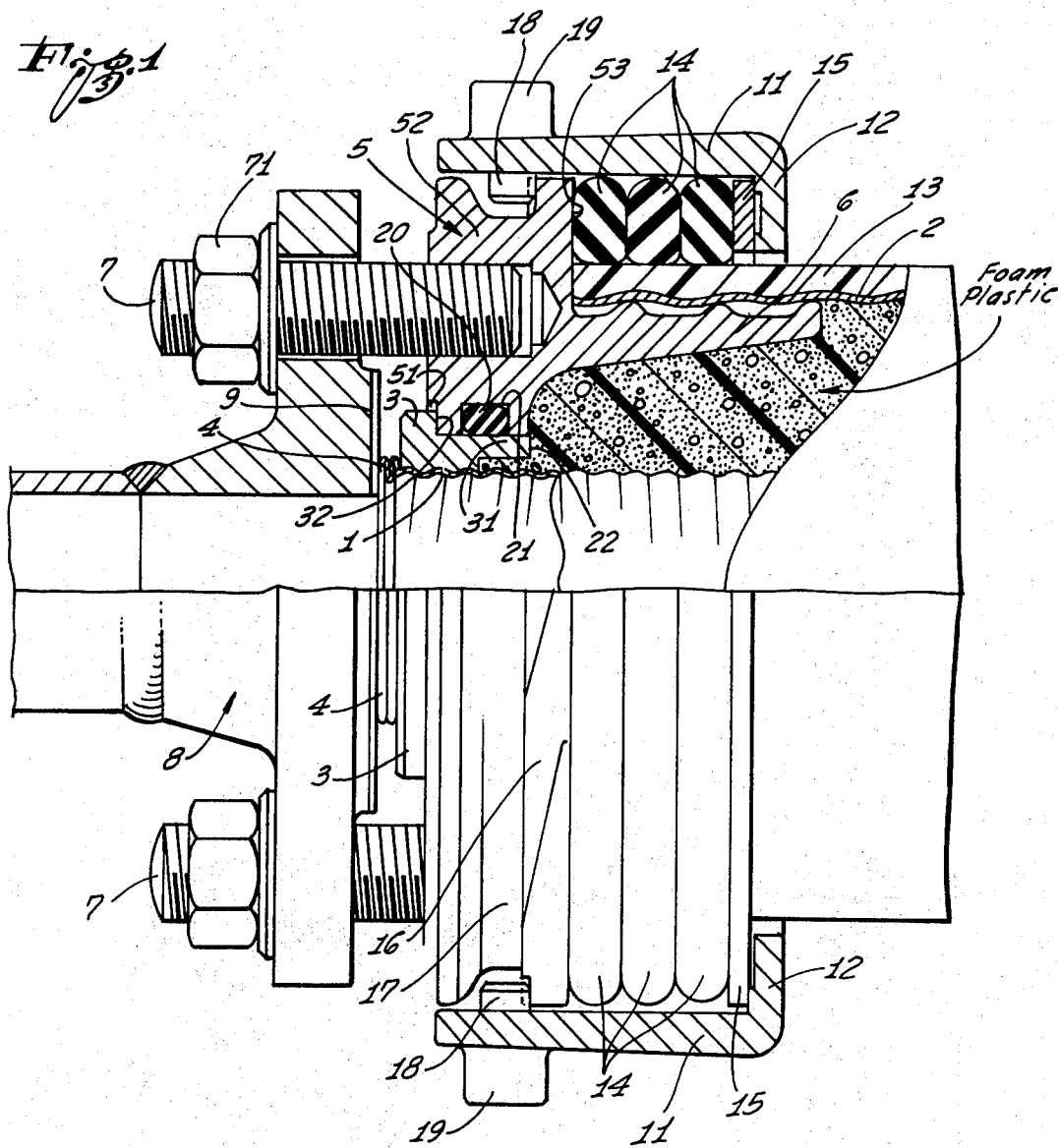

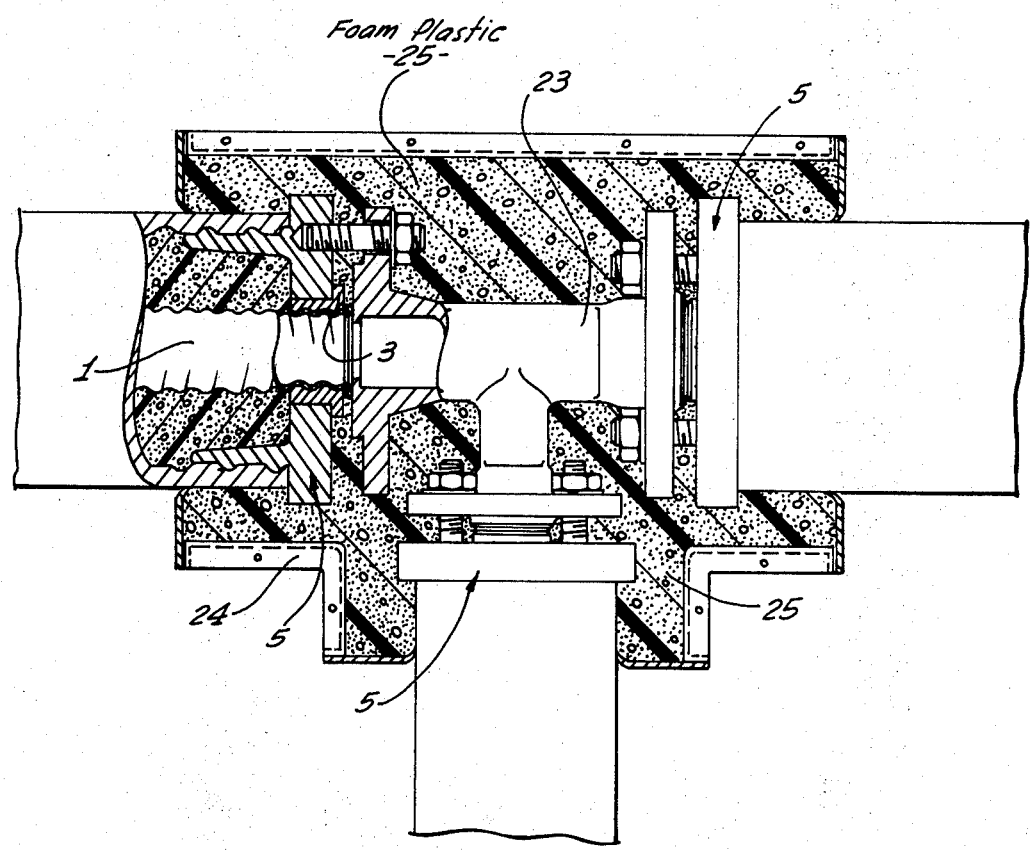

3,534,985
RELEASABLE JOINT FOR TWO COAXIAL, CORRUGATED PIPES
Hubert Kuypers, Bad Nenndorf, and Friedrich Schatz, Langenhagen, Germany, assignors to Kabel- und Metallwerke Gutehoffnungshutte Aktiengesellschaft, Hannover, Germany, a corporation of Germany
Filed Apr. 1, 1969, Ser. No. 812,184
Claims priority, application Germany, Mar. 30, 1968, 1,750,116
Int. Cl. F16l *11/12*
U.S. Cl. 285—53                      13 Claims

ABSTRACT OF THE DISCLOSURE

Structure for connecting the end of two coaxial corrugated pipes to a surface is disclosed positioning the two pipe ends relative to each other independent from individual thermal expansion of the pipes.

---

The present invention relates to a releasable connection such as a bolted joint between the end of a pipe system and a surface traversed by a fluid entrance or exit, the pipe system being comprised of two coaxial, corrugated pipes. Pipes for the transport of fluid are known to comprise two concentrical, for example, helically corrugated pipes or tubes thermally insulated from each other by a layer of foam rubber. A pipe or pipe system of this type is disclosed in patent application, Ser. No. 642,463, filed May 31, 1967, now Pat. No. 3,473,675 of common assignee.

As hot fluid, for example, passes through the inner one of such coaxial and corrugated pipes, a temperature gradient develops along any radius of such pipe system. Consequently the temperature of the inner pipe differs substantially from the temperature of the outer pipe, and the maintaining of such difference is the principal function of the thermal insulation between the two pipes. As a consequence they expand to a different degree. In particular the hot fluid in the inner pipe will cause this pipe to expand thermally more than the outer pipe. Each one of these pipes compensates by itself the thermal expansion as the corrugations take up the resulting pull and upsetting and there is practically no transmission of force between the pipes through the insulation. However, it was found that push and pull tension in the corrugations are not compensated at or near the end of the pipes of such twin pipe system where, for example, two such pipe systems are joined to provide a contiguous fluid path. Therefore, it was found that the pipes may be distorted at or near the joining structure.

In the known constructions for joining two such pipe systems the respective inner pipes are connected to each other directly or by means of T members having flanges. Of course, in such a case there remains a gap between the inner and outer pipes and water may seep into the isolation and reduce the capability thereof for thermally insulating the inner pipe from the environment. In order to obviate that deficiency it has been suggested to provide protective boxes around the joining areas and to fill these boxes with foam rubber. However, this construction is still not satisfactory because the pipes still can shift relative to each other as they expand and contract upon experiencing temperature variation, and they will thus shift in the respective entrance to the box which, in turn, renders the box less watertight.

It is an object of the present invention to provide a releasable bolt joint for connecting two coaxial, corrugated pipes to two similar, coaxial pipes or to any other structure provided with an aperture for fluid conduction into or out of the inner one of the two pipes, whereby distortions in the region of the joint are to be obviated to guarantee that the joint remains waterproof. In accordance with one aspect of the present invention in a preferred embodiment thereof, it is suggested to place a sleeve onto the end of the inner one of two corrugated pipes, and in engagement with the corrugations thereof for axial positioning. A flange member is provided in axial engagement with the sleeve for relative axial position to each other. The flange member is bolted to the structure to which the pipe system is to connect. The flange member is provided with a shaft which axially engages the corrugations of the outer pipe for axial positioning relative thereto. Thereby a positive joint is provided between inner and outer pipes which compensates axially directed tension or pressure forces. In the preferred form of practicing the invention, the two pipes are presumed to have helical corrugations, resembling the threading of a screw. The sleeve resembles a nut and is threaded onto the inner pipe and the shaft resembles a hollow bolt threaded into the outer pipe for tightening the flange (from which the shaft extends) against the front end of the outer pipe. Upon tightening the sleeve against the flange, there is provided watertight sealing of the interior space between the two pipes. Upon firmly tightening the flange member to the external structure, the flange member positively urges the sleeve axially against the inner pipe and the latter into positive engagement with the external structure adjacent the fluid conducting aperture thereof.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawing in which:

FIG. 1 illustrates a cross sectional view through an arrangement in accordance with the preferred form of practicing the invention, showing particularly the connection of two coaxial pipes to a single, solid pipe with end flange; and FIG. 2 illustrates a cross sectional view into a connective system for interconnecting the ends of three pipe systems, each having a pair of concentrically arranged pipes.

Proceeding now to the detailed description of the drawings, in FIG. 1 is shown an inner corrugated pipe 1 coaxially disposed in relation to an outer, likewise, corrugated pipe 2. Foam rubber 10 is generally disposed between the two pipes for thermally insulating them. These two pipes form a coaxial pipe system which extends generally to the right of FIG. 1 and for a readily selectible length. FIG. 1 illustrates particularly only an end portion of the pipe system. The pipe system may be such as disclosed in U.S. Letters Patent Ser. No. 642,463 filed May 31, 1967, now Pat. No. 3,473,675 or as disclosed in application Ser. No. 733,917 filed June 3, 1968, both of common assignee. The objective of the system and construction to be described in the following is to provide a fluid-conductive connection between the pipe system, particularly the inner pipe 1 thereof, and a pipe terminating in a pipe flange 8.

Preferably the corrugations of the two pipes 1 and 2 are helical, winding around the pipes to resemble the threading of bolts. A sleeve 3 is threaded onto the end of the inner pipe 1. The end proper of the pipe 1 projects beyond sleeve 3. This projecting end has been upset to form a broad annular or ring-shaped contact area 4 of constant inner and outer diameter. The ring width is essentially established by the amplitude of the corrugation.

The providing of such upset portion and the purpose thereof is disclosed, for example, in application Ser. No. 777,679 filed Nov. 21, 1968 of common assignee. The providing of such upset and portions permits the pipe to be joined at sufficient high contact pressure with another pipe or another element, such as pipe flange 8 illustrated in the figure. The sleeve 3 may thus be instrumental in the formation of the upset portion 4 and highly engages same.

The sleeve 3 has an annular, cylindrical recess to establish a short tubular portion 31. There remains then a flange having an annular surface 32. A flange element 5 is seated and centered on the tubular portion 31 of sleeve 3 extending in a plane transverse to its own axis, which is coaxial with the axis of the pipes, and axially facing away from the joint region.

Flange element 5 is provided with a shaft 6 having threading around its outer circumference with which it can be threaded onto the inner corrugation of the outer tube 2. Accordingly, the flange element 5 is threaded into the tube 2 until flange surface 53 abuts the front end of outer pipe 2 as well as of insulation 13 thereon. Threading in this manner permits tight fit.

Elements 3 and 5 are coaxial to pipes 1 and 2. Flange element 5 has a rather flat annular surface axially facing element 8. A shallow annular recess 51 around the inner perimeter is seated against the flange of sleeve 3 to provide axial engagement therewith at surface 31 thereof. The flange member 5 comprises a flange ring proper 52 which is provided with several axially extending bores to receive tension bolt 7. As illustrated in FIG. 1, the tension bolts 7 are threadably received in flange element 5 as well as in the pipe flange 8.

Upon tightening bolts 7, particularly upon tightening nuts 71 thereon, pipe flange 8 is urged against ring 4 which, in turn, forces sleeve 3 against flange member 5, as sleeve 3 threadedly receives pipe 1 and since shaft 6 on flange member 5 is threadedly received by pipe 2, there is positive but releasable connection provided between inner pipe 1 and outer pipe 2.

It may be advisable, particularly in case the fluid in the pipe system is under pressure, to provide a sealing ring 9, preferably a ring of asbestos, between the front face of flange 8 and ring 4. Sleeve 3 and flange 5 are additionally sealed by means of a ring 20. Sealing ring 20 is received in an annular groove 21 in flange element 5. The sleeve 3 can rather easily be screwed into flange element 5 if the end of the tubular portion 31 is beveled.

In order to prevent water from entering into the space between the two pipes 1 and 2, and particularly from being soaked up by the foam rubber 10, a protective sealing cap 11 is provided and particularly screwed onto flange element 5. The sealing cap has a stop flange 12 for compressing sealing rings. In particular there are provided three O-rings 14 as sealing rings which are placed on the outer coating 13 of pipe 2. Coating 13 is preferably made of or includes a plastic material as disclosed in the patents mentioned above. A flat metal slip ring 15 is placed between O-rings 14, particularly the one shown in the figure most to the right, and the stop flange 12. Upon rotating cap 11, stop 12 thereof can thus slide on ring 15 without damaging the adjacent O-ring.

Flange member 5 is provided with an outside thread comprised of oblique grooves 16 merging into a ring-shaped groove 17. Guiding pins 18 projecting from protective cay 11 run in these grooves. For tightening the protective cap 11, one can employ, preferably, a radially extending stud or handle 19 projecting outwardly from cap 11. By means of hammering against the stud 19, the cap 11 will be rotated to move in axial direction, toward the left in the drawing, and thereby the sealing rings 14 are compressed and tightened against flange member 5. In lieu of the stud 19, one could provide suitable notches in the outer surface of cap 11 for engagement with a wrench.

It can readily be seen that in case outer pipe 2 tends to expand, the expansion force is taken up directly by flange member 5 and transmitted onto pipe flange 8 two-fold; once through the bolts 7 and additionally through axial engagement with sleeve 3, upset ring 4 and also onto pipe flange 8. The latter force transmission path, however, includes the end of pipe 1, so that the relative position between pipes 1 and 2 at their ends, remains fixed. If outer pipe 2 contracts or inner pipe 1 expands, the pipes tend to separate sleeve 3 and flange member 5 from engagement, but bolts 7 and flange element 8 maintain the axial position of elements 3 and 5 relative to each other.

The embodiment illustrated in FIG. 2 is essentially comprised of most of the elements outlined above, at least as far as particular and critical configuration in the area of joining pipes is concerned. However, this figure illustrates how three pipe systems can be joined by means of a T-shaped element 23. The T-shaped element 23 is constructed in such a manner to establish operating surfaces as has flange element 8 in FIG. 1, and to each extremity of the T pipe ends can be joined, as described above.

Each of these pipe systems has two coaxial pipes, the outer one of which is provided with a flange element 5 and the inner one with a sleeve 3. However, in lieu of a protective cap 11, there is provided a biparted box 24 disposed around the three-pipe joining area and enclosing particularly the entire T-element and the adjoining pipe end portions, particularly the respective outer pipes 2 thereof. The interior of box 24 contains foam rubber 25. This construction has advantage in that heat losses are considerably reduced and sealing rings, as provided in the embodiment of FIG. 1, do not have to be used. It can readily be seen that the respective outer pipes will not thermally move relative to the box or to each other, as each of them is position arrested to the respective flange element 5 by means of inserted shaft 6, and the three flange elements are all bolted to the T-element 23 in the center of the arrangement.

The invention is not limited to the embodiments described above, but all changes and modifications thereof not constituting departures from the spirit and scope of the vention are intended to be included.

We claim:

1. In combination with a pipe system having two corrugated concentrically disposed pipes, there being an inner pipe and an outer pipe, and for providing a connection of an end of such a pipe system to a surface external to the pipe system and in relation to an opening in the surface to be aligned with the inner one of the two pipes; said outer pipe having a substantially constant outer diameter throughout its length;

a sleeve having contour means positioning the sleeve in engagement with the corrugations of the inner one of the two pipes and against relative axial movement thereto and near the end of the inner one of the two pipes to establish particular axial position relative thereto;

a flange member having abutment means engaging the sleeve in a particular axial position preventing relative axial movement there between in the direction of said end of said inner pipe, and having a shaft with contour means positioning said shaft in engagement with the corrugation of the outer pipe and against relative axial movement thereto to establish particular axial position of the outer one of the two pipes; and means including a plurality of clamping bolts disposed around the axis of the pipe system tightening the flange member to the external surface, thereby causing the front end of the inner pipe to be forced against the external surface and further causing the flange member to positively engage the sleeve to thereby positively position the end of the inner pipe relative to the end of the outer pipe.

2. The combination as set forth in claim 1, said contour means on said sleeve comprising a groove pattern matching the corrugation of the inner pipe, said sleeve further having a flange and a tubular portion, there being an annular surface facing away from the pipe ends, the flange member seated on the tubular portion and said abutment means bearing against the annular surface.

3. The combination as set forth in claim 2, the flange member seated on the tubular portion and having a groove, there being an O-ring in the groove engaging the tubular portion of the sleeve.

4. The combination as set forth in claim 1, the corrugation of the inner pipe having helical configuration representing threading of a bolt, the sleeve having a matching contour resembling the threading of a nut, and being threaded onto the inner pipe.

5. The combination as set forth in claim 1, the sleeve positioned adjacent an upset end portion of the inner pipe defining a ring having an axially facing surface for engagement with the external surface adjacent the aperture thereof.

6. The combination as set forth in claim 1, the flange member having a tubular portion having corrugated outer contour engaging the corrugation of the outer pipe from within.

7. The combination as set forth in claim 6, the corrugation of the outer tube having helical configuration resembling the threading of a nut, the tubular portion having matching configuration resembling the threading of a bolt and being threaded into the helical corrugation of the outer pipe.

8. The combination as set forth in claim 1, the flange member having a flange ring for receiving the tension bolts, the end of the outer pipe abutting against the flange ring; and sealing means on the outer pipe sealing the end of the outer pipe where engaging the flange ring.

9. The combination as set forth in claim 8, the sealing means including at least one O-ring seated on the outer one of the two pipes and further including a cap threaded onto the flange ring, the cap including a retaining annulus urging the O-ring against an axial surface of the flange ring against which the end of the outer pipe abuts.

10. The combination as set forth in claim 9, there being a slip ring provided between the annulus and the O-ring.

11. The combination as set forth in claim 9, there being a plurality of O-rings provided between the annulus and flange ring.

12. The combination as set forth in claim 9, there being a stud on the cap for threading the cap onto the flange ring.

13. The combination as set forth in claim 1 and including enclosure means disposed around the external surface and the flange member as well as the end portion of the outer pipe for sealing the latter elements and being filled with foam rubber.

References Cited

UNITED STATES PATENTS

| | | | |
|---|---|---|---|
| 1,315,784 | 9/1919 | Levitt | 285—149 |
| 2,309,719 | 2/1943 | Vaill | 285—149 |
| 2,848,254 | 8/1958 | Millar | 285—149 |
| 3,058,861 | 10/1962 | Rutter | 138—149 X |
| 3,377,464 | 4/1968 | Rolfes | 138—149 X |
| 3,393,267 | 7/1968 | Busse | 285—149 X |

FOREIGN PATENTS 536,264   1/1957   Canada.

DAVE W. AROLA, Primary Examiner

U.S. Cl. X.R.
285—138, 149, 368